US008818893B2

(12) United States Patent
Weinstein et al.

(10) Patent No.: US 8,818,893 B2
(45) Date of Patent: Aug. 26, 2014

(54) DYNAMIC PAYMENT GENERATOR

(75) Inventors: Howard O. Weinstein, Boston, MA (US); William E. Thomas, Charlotte, NC (US); Daniel M. Whipple, Charlotte, NC (US); Christopher Hope, Kent (GB); Savit A. Pirl, Bolingbrook, IL (US); Milton Santiago, Jr., Chicago, IL (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/218,602

(22) Filed: Aug. 26, 2011

(65) Prior Publication Data

US 2012/0323784 A1 Dec. 20, 2012

Related U.S. Application Data

(60) Provisional application No. 61/496,926, filed on Jun. 14, 2011.

(51) Int. Cl.
*G06Q 40/02* (2012.01)

(52) U.S. Cl.
CPC .................................... *G06Q 40/02* (2013.01)
USPC ............................ 705/39; 705/36 R; 705/35

(58) Field of Classification Search
USPC .................................................... 705/44, 35
See application file for complete search history.

(56) References Cited

U.S. PATENT DOCUMENTS 8,317,090 B2 * 11/2012 Wiesman et al. ............ 235/379
2005/0149335 A1 * 7/2005 Mesbah et al. ................ 704/277
2011/0276414 A1 * 11/2011 Subbarao et al. .......... 705/14.73

* cited by examiner

*Primary Examiner* — James A Vezeris
(74) *Attorney, Agent, or Firm* — Weiss & Arons LLP; Michael A. Springs, Esq.

(57) ABSTRACT

Apparatus and methods for providing a dynamic payment generator are provided. A customer of a financial institution may desire to conduct a transaction involving a transferor or transferee financial institution without prior knowledge regarding unique and specific information required by the transferor or transferee institution. In some embodiments, apparatus and methods may detect information entered by the customer and dynamically prompt the customer for additional information required by the transferor or transferee institution. Apparatus and methods may pre-fill fields on a form displayed to the customer with information required by the transferor or transferee institution.

14 Claims, 3 Drawing Sheets

DYNAMIC PAYMENT GENERATOR

CROSS-REFERENCE TO RELATED APPLICATION

This application is a nonprovisional of U.S. Provisional Application No. 61/496,926 filed on Jun. 14, 2011 which is hereby incorporated by reference in its entirety.

FIELD OF TECHNOLOGY

Aspects of the invention relate to providing apparatus and methods for a dynamic payment generator.

BACKGROUND

A financial institution (hereinafter "bank") may provide a customer of the bank an ability to conduct a transaction. A transaction may include a transfer of funds, payment of bills, debts and other monetary transactions. The transaction may be conducted with a third party. The bank used by the third party may be the same bank used by the customer or a different bank than the bank used by the customer.

A bank may follow specific internal procedures for facilitating a transaction between two or more parties. If the two parties use different banks, the different banks may follow different internal procedures. Furthermore, each party to a transaction may use a bank located in a different country. Each country may each use distinct currencies, languages and/or be subject to different regulations.

Despite a lack of awareness of specific bank procedures and/or differences among banks, a customer may wish to conduct a transaction without advance knowledge of specific procedures for conducting a successful transaction. For example, a successful transaction may require the customer to enter specific information in a specific format to satisfy requirements of a particular bank.

It would be desirable, therefore, to provide apparatus and methods for a dynamic payment generator.

SUMMARY OF THE DISCLOSURE

It is an object of this disclosure to provide systems and methods for a dynamic payment generator. The dynamic payment generator may prompt a customer to enter information for conducting a transaction. The form generation tool may visually prompt the customer to enter information by displaying a form. The form may contain fields for entering information. The form may dynamically change based on information entered by the customer.

The form generation tool may query a rules engine in substantially real-time. The form generation tool may query the rules engine as information is being entered by a customer into a displayed form. The customer may be prompted to enter information based on a reply to a query submitted to the rules engine. The customer may be given instructions based on a reply to the query submitted to the rules engine.

The form generation tool may be adaptive. The tool may "learn" based on information entered in past transactions executed by a customer.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
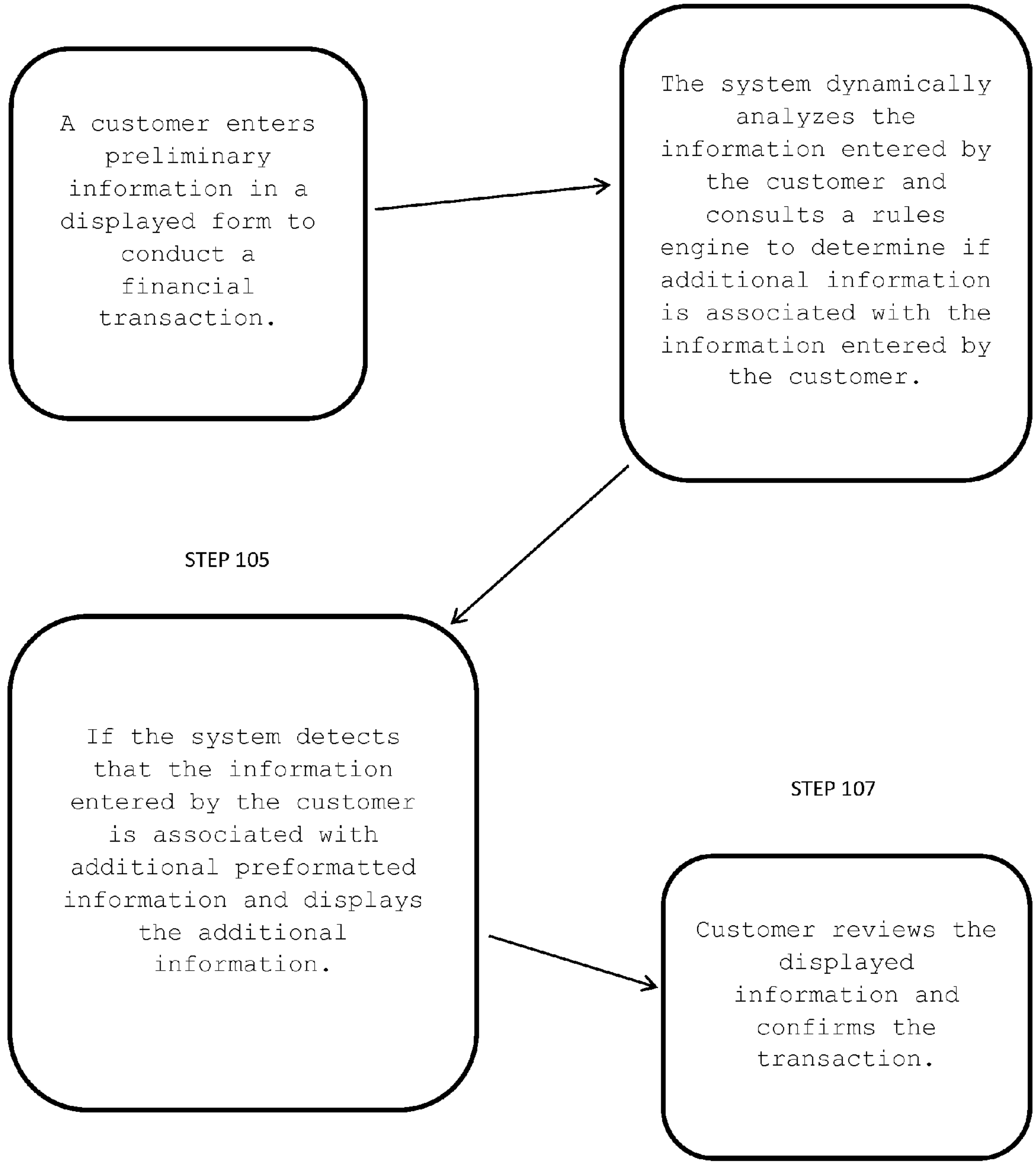
FIG. 1 shows a flow chart of an illustrative process in accordance with principles of the invention.

Systems and methods for providing a dynamic payment generator are provided. Embodiments may prompt a customer for information about a transaction. Prompting the customer may include presenting pre-formatted choices and/or instructions. The pre-formatted choices and/or instructions may be dynamically presented based on choices or information entered by the customer.

Embodiments may include a form generation tool. The form generation tool may prompt a customer to enter information for conducting a transaction. The form generation tool may visually prompt the customer to enter information by displaying a form. The form may contain fields for entering information. The form may dynamically change based on information entered by the customer.

A bank may have unique and specific internal procedures. The bank may therefore only process transactions that adhere to the requirements of the internal procedures. The internal procedures may include requiring specific information in a specific format. The tool may prompt the customer for information specific to a particular bank. The tool may prompt the customer to enter information in a specific format.

A transaction that does not contain information expected by the bank may fail. Therefore, providing bank-specific information in a format desired by the bank may reduce a risk that a transaction involving the bank may fail.

The form generation tool may present pre-filled information to a customer. Providing a dynamic form that pre-fills information expected by a bank based on initial information entered by a customer may reduce the risk of a failed transaction. Moreover, a form that contains information expected by a bank may reduce an amount of time the customer spends entering or re-entering information if a transaction fails due to inclusion of unexpected information.

For example, information pre-filled by the form generation tool may conform to specific requirements of a transferor bank or transferee bank for successfully implementing a transaction. Pre-filled information may include special characters or codes recognized by a transferor or transferee bank.

The tool may recognize terms entered by a customer and pre-fill the form with additional information. The tool may recognize terms entered by a customer and prompt the customer to enter additional information in a specific format.

The tool may prompt the customer to enter information that may aid organization and retrieval of previously conducted transactions. The tool may reduce the burden of entering information for conducting a future transaction.

A customer that desires to conduct a transaction may enter information into a form displayed by the form generation tool. For example, the form generation tool may prompt a customer to enter a payment name. The payment name may be a name assigned by the customer to a payment or transaction.

Assigning a familiar payment name to a transaction may facilitate efficient organization of one or more transactions bearing an identical or similar name. The assigned name may enable a customer to better organize or search numerous transactions. For example, a payment name may include "2011 Federal Taxes" or "March 2011 Payroll".

The customer may later view a report of transactions made over a period of time. The customer may later search for a particular transaction, or any transaction conducted on a particular day of the week or month. The customer may create a report based on a search of a term, such as year, month or a keyword. The keyword may be part of a payment name.

The form generation tool may interact with a rules engine. The rules engine may include a database configured to store searchable rules. The rules may provide guidance to the form generation tool regarding information relating to a transaction.

The form generation tool may query the rules engine in substantially real-time. The form generation tool may query the rules engine in response to information entered by a customer into a form. The customer may be prompted to enter information based on a reply to the query submitted to the rules engine. The customer may be given instructions based on a reply to the query submitted to the rules engine. The customer may be prompted or provided instructions in substantially real time.

The form generation tool may include field mapping. Field mapping may associate a field displayed on the form, and/or information entered into the displayed field, to a rule contained in the rules engine. The association may be implemented using an XML value. The association may be made by a customer.

Via the rules engine, field mapping may correlate an associated field with a business validation rule. For example, a business validation rule may require that the associated field begin with a particular set of characters. As a further example, a business validation rule may require that if the associated field is present, another field must be displayed on the form as well.

Field mapping may dynamically alter an appearance of the form and/or information associated with the form. For example, if a customer has initiated a transaction that the customer has titled "invoice," field mapping may associate the title "invoice" with a field for entering an invoice number. A field for entering an invoice number may be dynamically displayed after detection of the title "invoice" entered by the customer.

Field mapping may not allow information contained in the form to be transmitted unless the customer enters a valid invoice number into the displayed field.

One or more queries may be submitted to the rules engine in substantially real time, preferably while a customer is entering information. For example, field mapping may associate an invoice number entered by the customer with a specific client of the customer. The displayed form may further dynamically display a set of fields associated with the specific client associated with the invoice number. The set of fields may include the client's billing address, the client's bank, and a payment method preferred by the client. The dynamic display of additional fields may ensure that information needed for timely payment to or from the client is properly entered. The dynamically displayed fields may be pre-filled with information.

A payment name may be displayed to a customer as a choice among two or more payment names. The customer may select one payment name from among the choices. Each choice may be associated with a business validation rule.

For example, based on a selected payment name, the form generation tool may be configured to query the rules engine and dynamically display and/or pre-fill one or more fields on the form. Thus, based on the selected payment name, the tool may be configured to dynamically impose formatting restrictions on information entered by a customer.

As another example, if a payment name is associated with a transaction involving a foreign bank, the tool may dynamically display and pre-fill a field including a required country code for an international transfer of funds.

As a further example, the form generation tool may detect that information has been entered into a form that satisfies requirements of an invoice payment—i.e. the customer has filled a field indicating that a payment is to be made to a specific vendor. The tool may further detect that the customer has not entered an invoice number associated with the specific vendor or has not entered a valid invoice number. The tool may prompt the customer to enter a valid invoice number before processing the transaction.

The form generation tool may be adaptive. The tool may "learn" based on information entered in past transactions executed by a customer. The tool may "learn" that if a transaction is assigned a particular payment name, the transaction may likely be associated with a set of characteristics. Thereafter, if the tool detects entry of the particular payment name, the tool may prompt the customer to enter information relating to the set of characteristics. The form may dynamically display to the customer pre-filled information relating to the set of associated characteristics.

The form generation tool may include prompting a customer to enter a payment category. The payment category may assign a level of security to a transaction.

For example, a transaction involving payments to a bank in a foreign country may include a restriction on an amount of money that may be transferred in a single transaction. A restriction may limit a total amount of money that may be transferred using two or more transaction conducted within a defined time period. If a security category is associated with a transaction, a security restriction may be imposed on the transaction.

The tool may pre-fill information associated with a security restriction. For example, the tool may dynamically pre-fill a field with a list of banks in a foreign country that are deemed to be reliable partners for conducting an international transfer of funds. The tool may deny transactions involving particular banks. The tool may deny transactions involving a transfer to/from particular countries.

The information associated with the security restriction may not be visible to the customer. For example, information associated with a restriction may include flagging a transaction. Flagging the transaction may indicate that the transaction is to be encrypted before transmission to a foreign bank.

A security category may include performing a transaction within a specific time frame. For example, if the tool detects that a transaction is a payroll payment, an associated security category may ensure that the transaction is completed within one day even if that day occurs during a weekend.

The form generation tool may display informational items. For example, a field displayed on a form by the form generation tool may include a field name. A field name may inform a customer what information is expected to be entered in a field. For example, a field name may include an "account number" name. The name may inform a customer that the field requires a valid and correctly formatted account number.

An informational item displayed by the form generation tool may be displayed based on prior information entered by a customer. An informational item displayed by the form generation tool may be displayed based on a query submitted to the rules engine.

An informational item displayed by the form generation tool may appear in one or more languages. The form generation tool may accept entry of information entered in one or more languages on one or more forms and/or in one or more fields.

For example, a field name may be displayed in a foreign language or in multiple languages. A customer initiating a transaction with a bank in a different country may be familiar with the language spoken in the different country. Displaying a field name in multiple languages may increase the likelihood that the customer understands what information is expected to be entered in a field.

An informational item displayed by the form generation tool may be dynamically selected and displayed based on information entered by a customer into the form.

For example, if a customer enters information indicating a transaction is a transfer of funds where both the transferor and transferee bank are the same bank, one set of fields and field names may be displayed. If a customer enters information indicating a transaction is a transfer where the transferor and transferee banks are different entities, another set of fields and associated field names may be displayed.

The form generation tool may recognize terms entered by the customer and prompt the customer to correct the information entered. The form generation tool may dynamically correct information entered by the customer. The tool may be configured to dynamically correct information entered in a foreign language. The tool may prompt the customer to make a correction to information entered by displaying a message in the language used by the customer to when entering information into the field. The tool may dynamically detect the language used by the customer.

The form generation tool may support a minimum and/or maximum field length. The minimum and/or maximum field length may direct a customer to enter information in a specific format.

For example, if a customer indicates that a payment is to be made to a foreign bank, an account number associated with the transaction may require a particular grouping of alphanumeric characters having a known length. The minimum and/or maximum field length may ensure that the customer enters the correct grouping of characters having the known length.

The minimum and/or maximum field length may be dynamically determined based on information entered by a customer. For example, if a customer indicates that a transaction involves a threshold value, the form may dynamically require the customer to enter a verification sequence. The verification sequence may include an answer to a question selected by the customer. The answer selected by the customer may have a defined length.

The form generation tool may include help text. Help text may provide an explanation to a customer. For example, the explanation may include what information is expected to be entered in a particular field, in what format the information should be entered, why a particular field appears on the form, or where a customer may obtain information required by a field.

The help text may appear when a customer "hovers over" the field with a pointing device. The help text may appear in multiple languages. The help text may appear in a language associated with a bank or party involved in the transaction. The help text may be dynamically generated based on information entered by a customer into a form.

The form generation tool may dynamically verify that information entered into a field is valid. Help text may appear if the tool detects a possibility that a customer may have entered incorrect or invalid information. The tool may prevent further entry of information or may not display one or more fields until information entered in a prior field has been verified.

Verification of information before allowing a customer to fill additional fields on a form may limit customer frustration. The customer may be prevented from spending time filling out multiple fields before being informed that information entered may be incorrect or invalid.

For example, a field may prompt the customer to enter a bank account number. After detecting entry of an account number the form generation tool may dynamically verify that the account number entered by the customer is valid. If the tool detects that the account number is invalid, the tool may inform the customer. Verification of information may be accomplished by a correlation performed by the rules engine.

The tool may further dynamically prompt the customer to make a correction to entered information by informing the customer of a desired format or composition of information. For example, if the tool detects that the customer has entered an invalid foreign bank account number, help text may be displayed informing the customer of an exemplary format of a bank account number used at the foreign bank.

Fields displayed by the form generation tool may include options. The options may include alpha or numeric text boxes, radio buttons, read only fields, search buttons and drop down list boxes. A customer may create and/or customize a list of options to be displayed in a drop down list box.

A list of options may be dynamically populated and/or displayed based on other information entered by a customer into the form. The options may be dynamically displayed in a specific format.

An option may be associated through field mapping with additional information. If the customer selects a particular option, the rules engine may associate the customer's choice with additional fields and/or information. The additional fields and/or information may be dynamically displayed.

For example, a list of payment names may be displayed to a customer. If a customer indicates that a transaction is a payroll payment, another field on the form may be pre-populated with a list of payment options available to the customer for making the payroll payment.

The form generation tool may be configured to dynamically alter a form as a customer enters information into a field. For example, if the customer has indicated that a transaction involves a transfer of funds, the customer may be dynamically prompted for a destination bank. As the customer begins to enter the name of the destination bank, the tool may present a list of banks that begin with the words or letters entered.

The form generation tool may support a reporting field display. The customer may hide or display fields filled in conjunction with a transaction. Hiding fields may facilitate summary reporting views of one or more previously conducted transactions. For example, a field may exist on an information entry screen but may not be displayed on a summary report view of the transaction.

Displayed fields may be moved to different positions on a form. For example, field may be placed under different sub-headers or sub-categories of a form. The different positions may provide a customized organizational layout of a form.

Fields may be moved or placed using a drag and drop capability. Using a pointing device, the customer may select a field and move the field to a desired location. Such a capability may allow the user to define the layout of the fields on the screen.

The form generation tool may support a preview function. The preview function may provide the customer a view of the form that is being generated. The preview function may allow the user to see groups of fields connected through field mapping. The preview function may verify information entered into the form. The preview function may display fields that are associated with each other for dynamic display.

For example, field mapping may associate an invoice number with a group of fields to be filled. Using the preview function, the customer may preview a form displaying the fields associated with a field containing an invoice number. The preview function may be available to the customer before information is entered into fields associated with the invoice number and/or after information has been entered into the associated fields.

The preview function may allow a customer to provisionally select options and view an anticipated payment screen and information that may be required based on the selected options.

For example, if a customer is uncertain of what information may be required to complete an invoice payment, the customer may select “invoice payment” from a list of payment names. The customer may view fields associated with the selected option “invoice payment” that the customer may be required to complete to successfully initiate an invoice payment.

Thus, as an example, a customer may obtain requisite knowledge of information and/or regulatory requirements for successful initiating an invoice payment via a transferee bank or transferor bank located in a foreign country.

The form generation tool may dynamically limit countries in which transactions may be conducted. For example, the form generation tool may only permit transactions to originate from and/or be credited to particular banks. Transactions may also be limited based on geographic considerations such as a transferor country, transferee country or particular currency. When a customer enters bank information into a field, the form generation tool may dynamically check if the information is associated with a restricted bank.

As a further example, the form generation tool may enable or disable payment using specific SWIFT BICs. A SWIFT BIC is a standard of business identifier codes (“BIC”) approved by the International Organization for Standardization (“ISO”). The codes may be used when transferring money between banks. A particular bank may be associated with a specific SWIFT BIC. A branch of a bank may be associated with a specific SWIFT BIC. A SWIFT BIC may be used for international money transfers or for communicating inter-bank and/or intra-bank messages.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Processes in accordance with the principles of the invention may include one or more features of the process illustrated in FIG. 1.

FIG. 1 shows an illustrative process in accordance with principles of the invention. At step 101, a customer enters preliminary information into a displayed form to conduct a financial transaction. The form may be displayed by the form generation tool. At step 103, the system dynamically analyzes the information entered by the customer and consults a rules engine to determine if additional pre-filled fields are associated with the information entered by the customer. At step 105, if the system detects that the information entered by the customer is associated with additional pre-filled fields, the pre-filled fields are displayed on the form. At step 107, the customer reviews the displayed information and confirms the transaction.

Figure 2:
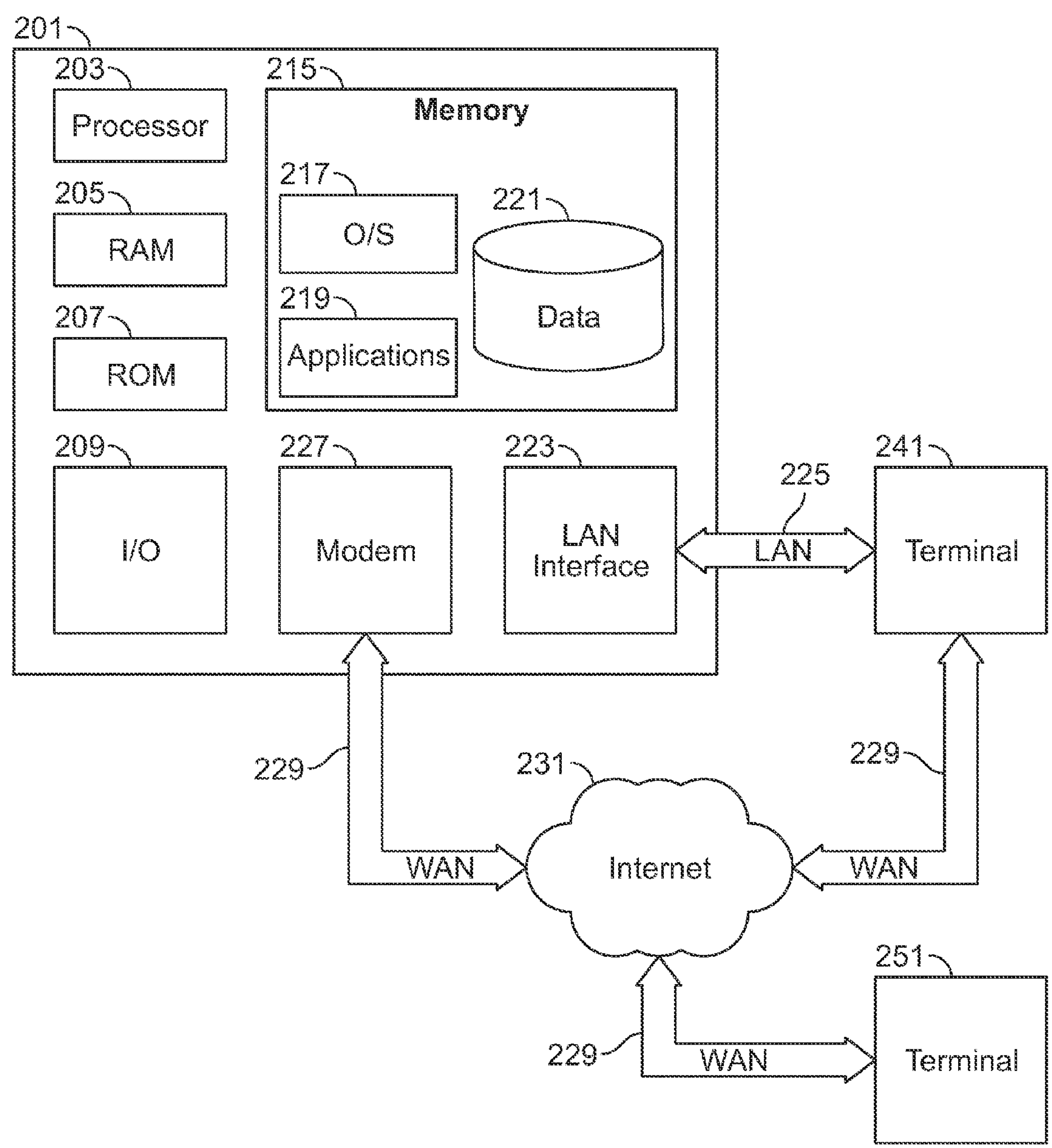
FIG. 2 shows a schematic diagram of a general purpose digital computing environment in which one or more aspects of the present invention may be implemented.

FIG. 2 illustrates a block diagram of a generic computing device 201 (alternatively referred to herein as a “server”) that may be used according to an illustrative embodiment of the invention. The computer server 201 may have a processor 203 for controlling overall operation of the server and its associated components, including RAM 205, ROM 207, input/output module 209, and memory 215.

I/O module 209 may include a microphone, keypad, touch screen, and/or stylus through which a user of device 201 may provide input, and may also include one or more of a speaker for providing audio output and a video display device for providing textual, audiovisual and/or graphical output. Software may be stored within memory 215 and/or storage to provide instructions to processor 203 for enabling server 201 to perform various functions. For example, memory 215 may store software used by server 201, such as an operating system 217, application programs 219, and an associated database 211. Alternatively, some or all of server 201 computer executable instructions may be embodied in hardware or firmware (not shown). Database 211 may provide centralized storage of business validation rules, field mapping relationships or other information utilized by the rules engine or form generation tool.

Server 201 may operate in a networked environment supporting connections to one or more remote computers, such as terminals 241 and 251. Terminals 241 and 251 may be personal computers or servers that include many or all of the elements described above relative to server 201. The network connections depicted in FIG. 2 include a local area network (LAN) 225 and a wide area network (WAN) 229, but may also include other networks. When used in a LAN networking environment, computer 201 is connected to LAN 225 through a network interface or adapter 213. When used in a WAN networking environment, server 201 may include a modem 227 or other means for establishing communications over WAN 229, such as Internet 231. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 219 used by server 201 according to an illustrative embodiment of the invention may include computer executable instructions for invoking user functionality related to communication, such as email, short message service ("SMS"), and voice input and speech recognition applications.

Computing device 201 and/or terminals 241 or 251 may also be mobile terminals including various other components, such as a battery, speaker, and antennas (not shown).

Figure 3:
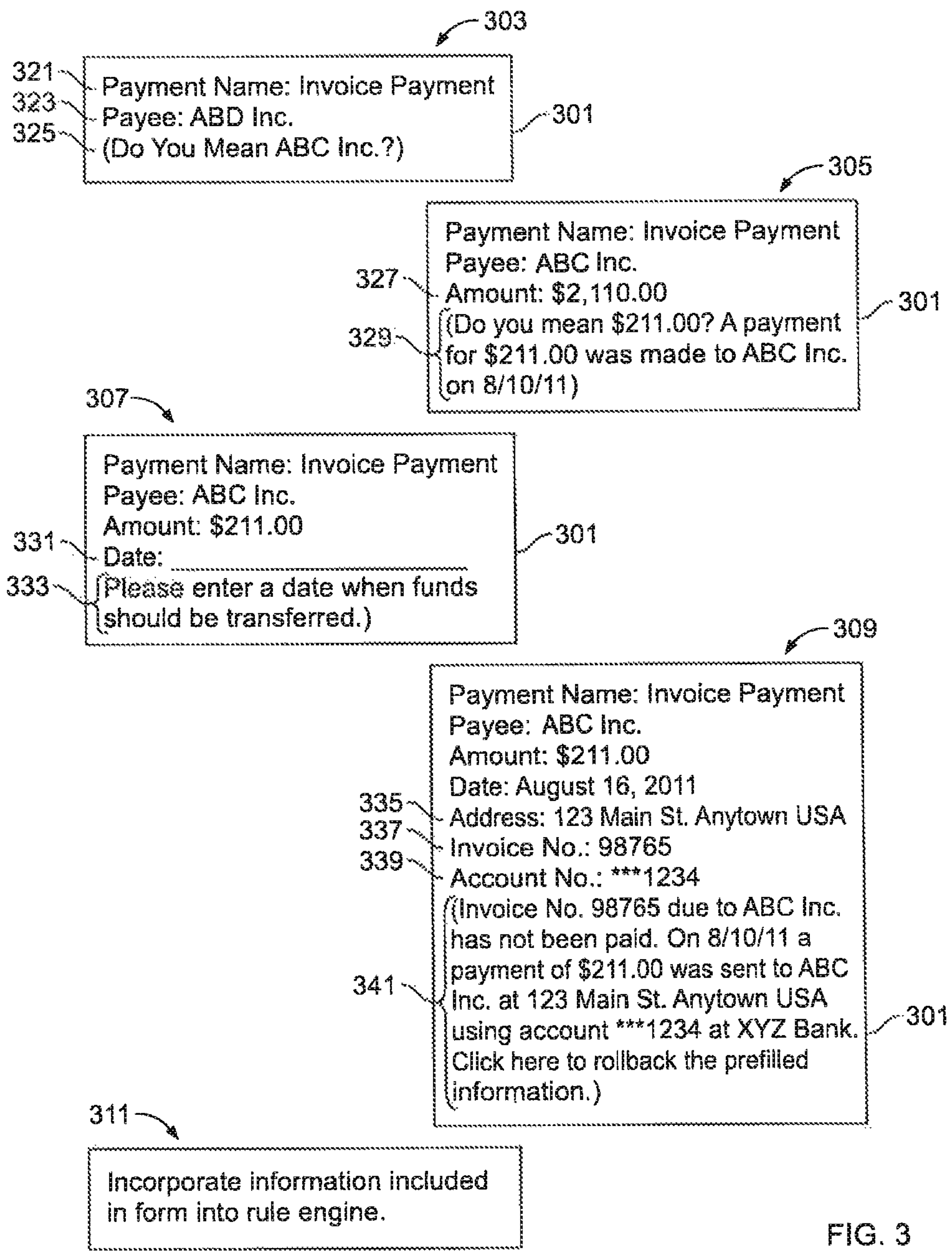
FIG. 3 shows illustrative steps in accordance with principles of the invention.

FIG. 3 shows illustrative steps that may be taken in accordance with principles of the invention. At step 303, a customer may enter information into displayed form 301. The information entered by the customer may include a payment name 321 and a payee name 323. As the customer enters payee name 323, form 301 dynamically prompts the customer to verify that the payee name 323 is correct. Based on a response to a real-time query submitted to, and received from, a rules engine (not shown) the customer may be presented with suggested correction 325.

The rules engine may dynamically associate payee name 323 entered by the customer, even if it is misspelled, with a previously conducted transaction. The customer may be prompted to coordinate information included with the current transaction and information included with an earlier transaction.

At step 305, the customer may enter an amount 327 and form 301 may again dynamically change. The change may be based on results of another query to a rules engine (not shown). Based on the results of the query, the customer may be prompted by displayed information 329 to verify the amount entered.

At step 307, field mapping may associate a date field 331 with fields 321, 323 and 327. The date field 331 may indicate when the customer would like the amount 327 transferred to the payee 323. The customer may be shown text 333 describing the purpose of a displayed field.

At step 309, form 301 may again dynamically change. Based on the results of another query to, and response received from, the rules engine, form 301 may also display additionally fields 335, 337 and 339. Fields 335, 337 and 339 may be displayed pre-filled with information.

Form 301 displays help text 341. Help text 341 provides explanatory remarks and informs the customer how to remove pre-filled information entered into fields 335, 337 and 339.

At step 311, information included in form 301 may be incorporated in the rules engine. Adding the new information to the rules engine may allow the form to function adaptively. The next time the customer enters information into the form, all information incorporated into the rules engine may be considered in order to dynamically verify information currently entered by the customer.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like. In a distributed computing environment, devices that perform the same or similar function may be viewed as being part of a "module" even if the devices are separate (whether local or remote) from each other.

The invention may be described in the general context of computer-executable instructions, such as program modules, being executed by a computer. Generally, program modules may include routines, programs, objects, components, data structures, etc., that perform particular tasks or store or process data structures, objects and other data types. The invention may also be practiced in distributed computing environments where tasks are performed by separate (local or remote) processing devices that are linked through a communications network. In a distributed computing environment, program modules may be located in both local and remote computer storage media including memory storage devices.

Thus, systems and methods for a dynamic payment generator have been provided. Persons skilled in the art will appreciate that the present invention can be practiced by other than the described embodiments, which are presented for purposes of illustration rather than of limitation. The present invention is limited only by the claims that follow.

What is claimed is:

1. One or more non-transitory computer-readable media storing computer-executable instructions which, when executed by a processor on a computer system, perform a method for facilitating an international transfer of funds from a transferor bank to a transferee bank, the method comprising:

dynamically prompting a customer to enter transferor bank information and transferee bank information;

detecting transferor bank information and transferee bank information entered by the customer, the transferee bank information comprising a country code of the transferee bank;

querying a roles engine for an attribute associated with the country code of the transferee bank entered by the customer;

based on the attribute, dynamically prompting the customer to complete transferee bank information, the dynamically prompting comprising pre-filling at least a portion of the transferor bank information or the transferee bank information, the pre-filling being based, at least in part, on the country code.

2. The media of claim 1 wherein the payment information entered by the customer comprises a destination country.

3. The media of claim 1 wherein the payment information entered by the customer comprises an invoice number.

4. The media of claim 1 wherein the payment information entered by the customer comprises a payment name.

5. The media of claim 1 wherein the attribute is a security category.

6. The media of claim 1 wherein the attribute is a regulation governing the transferor bank or transferee bank.

7. The media of claim 1, the method further comprising verifying validity of the transferor or transferee information entered by the customer.

8. The media of claim 1, the method further comprising displaying instructions directing the customer to enter transferor bank information or transferee bank information in a specific format.

9. The media of claim 1, the method further comprising dynamically appending a field to a displayed form.

10. The media of claim 1, the method further comprising informing the customer of a limit on a value of a payment associated with the international transfer of funds.

11. The media of claim 1, the method further comprising informing the customer of a limit on a frequency of a payment associated with the international transfer of funds.

12. The media of claim 1, the method further comprising dynamically correcting transferor bank information or transferee bank information entered by the customer.

13. The media of claim 1, the method further comprising displaying a sample format of transferor bank information or transferee bank information.

14. The media of claim 1 wherein the transferor bank information or transferee bank information is entered by the customer in a first language and the dynamic prompting is in a second language.

* * * * *

UNITED STATES PATENT AND TRADEMARK OFFICE

CERTIFICATE OF CORRECTION

PATENT NO. : 8,818,893 B2
APPLICATION NO. : 13/218602
DATED : August 26, 2014
INVENTOR(S) : Howard O. Weinstein et al.

It is certified that error appears in the above-identified patent and that said Letters Patent is hereby corrected as shown below:

In the Claims

Column 10, Line 40, Claim 1 please replace ‘roles’ with --rules--.

Signed and Sealed this
Twenty-fourth Day of February, 2015

Michelle K. Lee

Michelle K. Lee
*Deputy Director of the United States Patent and Trademark Office*